United States Patent Office 3,426,585
Patented Feb. 11, 1969

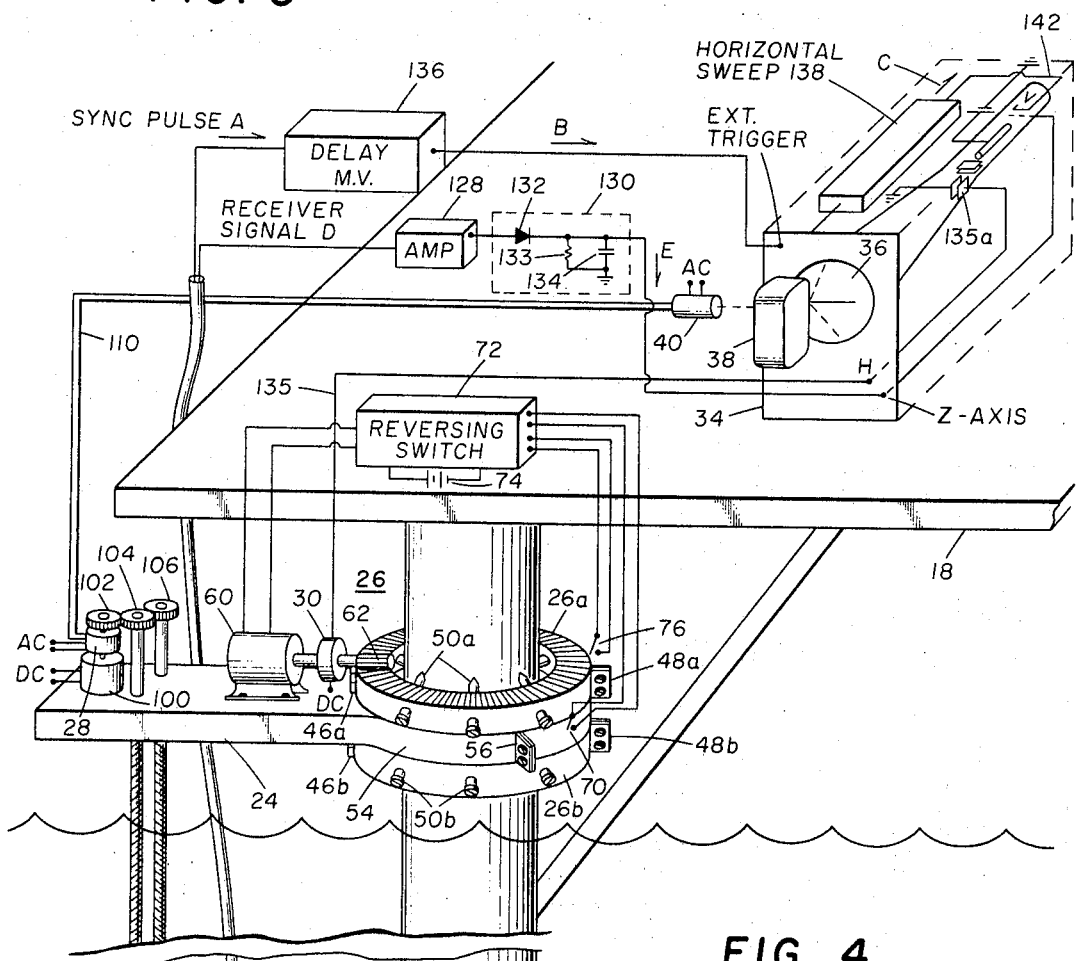

3,426,585
ULTRASONIC SYSTEM FOR INSPECTING
SUBMERGED PILES
Joseph Zemanek, Jr., and Richard L. Caldwell, Dallas,
Tex., assignors to Mobil Oil Corporation, a corporation of New York
Filed Feb. 3, 1966, Ser. No. 524,920
U.S. Cl. 73—67.7           1 Claim
Int. Cl. G01n 9/24

ABSTRACT OF THE DISCLOSURE

The specification discloses an ultrasonic system for inspecting the physical condition of the exterior surfaces of piles supporting offshore well platforms and the like. The system includes an ultrasonic transmitter-receiver for generating and receiving a directional beam of ultrasonic pulses. The transmitter-receiver is scanned both peripherally and longitudinally about the pile. The reflected sonic pulses are converted to electrical form and are used to intensity modulate the beam of a cathode-ray oscilloscope. The oscilloscope beam is swept along its X-axis in accordance with the peripheral scan of the transmitter-receiver. A motion picture camera optically coupled to the oscilloscope drives film past the oscilloscope face in proportion to the scan of the transmitter-receiver longitudinally of the pile. The film, developed from the motion picture camera, indicates the physical condition of the pile including flaws and weaknesses.

---

This invention relates to an apparatus for inspecting the condition of submerged surfaces such as piles, and more particularly, to the production of a facsimile of a submerged surface using a beam of repetitive sonic pulses scanned along the surface.

In the building of boat docks, bridges, oil well drilling and production platforms, and offshore radar stations, vertical supporting members, generally called piles or pilings, are used as the supporting legs of each of the platforms. The piles often have a solid cylindrical surface, composed of timber or steel pipe. After periods of time, the piles, no matter what the material of construction, begin to deteriorate or corrode. In the case of offshore oil well drilling or production platforms, the cylindrical steel piles extend into perhaps hundreds of feet of water, making them difficult to inspect even with diving apparatus. Even when diving apparatus can be used in deep water, the diver's eyes often cannot see beneath the barnacles and corrosion to detect cracks and weaknesses in the exterior surface of the pile.

Therefore, it is the primary object of the present invention to provide an improved apparatus for easily and practically inspecting submerged surfaces, such as piles and the like.

It is another object of the present invention to inspect submerged surfaces through a coating of barnacles, corrosion, or other material.

It is yet another object of this invention to provide an apparatus that permits rapid inspection of pilings for weaknesses in the structure to avoid accidents due to the failure of a piling.

In accordance with this invention, there is provided an ultrasonic system for inspecting the exterior of a pile. The system includes a transducer assembly which generates and receives a beam of ultrasonic pulses.

A scanning devices moves the transducer assembly in a predetermined scanning pattern about the exterior surface of the pile at a substantially constant distance from the surface.

In a preferred embodiment, the scanning pattern includes movement in a direction about the longitudinal axis of the pile, which may be cylindrical in shape, and in a direction along the longitudinal axis of the pile. As the transducer assembly is moved about the pile, a position means generates signals proportional to the position of the transducer assembly in the scanning pattern. A display device then sweeps a recording beam of energy, such as an electron beam, across a display medium in accordance with the position signals. The recording beam of energy is intensity modulated by signals representative of the reflected pulses whereby there is produced on the recording medium a picture of the surface of the pile.

In a more specific aspect of our invention, the display device includes a cathode-ray tube having electrostatic deflection plates for sweeping an electron beam across the face of the tube in a direction and with speed proportional to the movement of the transducer assembly in one direction along the surface of the pile. Also included in the display device are means for passing a photographic recording medium across the face of the cathode-ray tube in a direction and with speed proportional to movement of the transducer assembly in the other direction along the surface of the pile.

In a preferred embodiment, the electron beam of the cathode-ray tube is swept across the face thereof in a horizontal direction in proportion to horizontal movement of the transducer assembly about the longitudinal axis of the vertical pile. Also, the photographic film, which may be contained within a separate camera, is moved across the face of the cathode-ray tube in a vertical direction in proportion to the movement of the transducer assembly along the longitudinal axis of the vertical pile.

For other objects and advantages and a better understanding of the present invention, refer now to the following detailed description and accompanying drawings in which:

FIGURE 1 illustrates diagrammatically the technique for ultrasonic scanning of a cylindrical pile;

FIGURE 2 further illustrates the technique for displaying the reflected ultrasonic pulses;

FIGURE 3 illustrates diagrammatically one form of apparatus embodying the invention;

FIGURE 4 illustrates waveforms representative of those electrical signals appearing at the indicated points in the apparatus of FIGURE 3.

Figure 1:
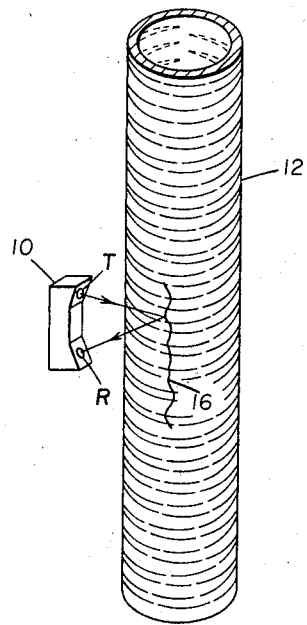

Referring again now to FIGURE 1, there is illustrated a transducer assembly 10 positioned adjacent a cylindrical piling 12. While a cylindrical piling, such as one that might support a self-raising offshore drilling platform is illustrated, other shapes, such as triangular or rectangular, may be investigated equally as well. The transducer assembly 10 includes a transmitter T and a receiver R for generating and receiving a beam of repetitive sonic pulses, preferably with a peak frequency of about two megacycles per second. The transmitter T and the receiver R are so inclined to one another that a pulsed beam of radiation emitted by transmitter T is reflected back at the exterior surface of pile 12 to be detected at receiver R. A suitable pulse repetition rate for sonic pulses as used in our invention may be about one kilocycle per second.

To provide complete coverage of echo pulses from the surface of piling 12, the transducer assembly 10 is maintained at a substantial constant distance from the surface of piling 12 as it is oscillated about the longitudinal axis of piling 12. The transducer assembly 10 may be maintained a distance of about 5 or 6 inches from the periphery of piling 12. Where there are no supporting members or trusses attached to the side of piling 12, the transducer assembly 10 is preferably oscillated about the piling 12 through 360°. At the same time the transducer assembly 10 is oscillating horizontally, it is moved more slowly in a vertical direction along the pile 12.

Figure 2:
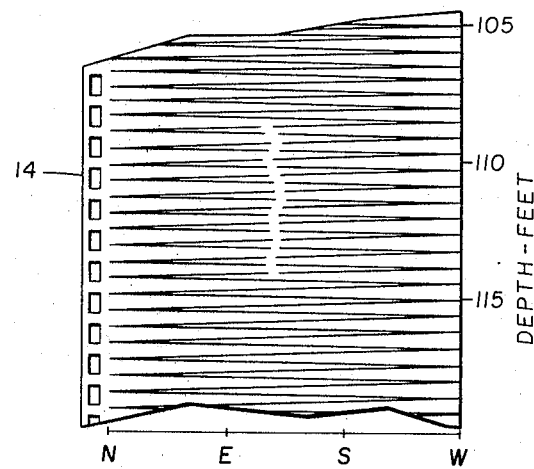

As the transducer assembly 10 is scanned about the piling 12, the reflections received by receiver R are analyzed by a technique illustrated in FIGURE 2. Therein, a recording beam of energy, such as a beam of light, is swept across a recording medium, such as photographic film 14, with a motion related to the position of the transducer 10 in its scanning pattern. As transducer assembly 10 is oscillated around the periphery of piling 12, a beam of light is swept horizontally across the photographic film 14. Similarly, as the transducer assembly 10 moves vertically, the photographic film 14 is moved vertically past the light beam. As the light beam is swept across the photographic film 14, it is modulated in character by the received echo pulses at receiver R. Preferably, it is intensity modulated so that as the light beam sweeps across the film 14 it becomes intense in spots whenever an echo pulse is received. Therefore, there may be produced on film 14 an accurate picture of the piling 12 unfolded into a plane.

One of the many advantages of our invention is that the image contained on the photographic film 14 includes a detailed inspection of the very surface of the piling. If there are barnacles, corrosion, or mud on the surface of the piling 12, a small amount of energy is returned from these interfaces but the primary echo is returned from the surface of the steel or wood piling. Thus, if there is a crack, hole, split or weak spot in the piling 12, such as crack 16, there appears on the photographic film a reproduced image of the crack because the sonic pulses are diffused and diffracted as the sonic beam passes over the crack. Such detailed inspection of the surface of a piling beneath an overlayer is not possible even with the eyes of a diver sent down to inspect the piling.

Turning now to FIGURE 3, there is shown a cylindrical piling 12 supporting a platform 18 which may be the surface of an offshore drilling rig. Typcially, piling 12 extends into the ocean a depth of 100 or 200 feet.

Briefly, the operation of the system of FIGURE 3 is as follows. The transducer assembly 10 including a transmitting crystal T and a receiver crystal R, both contained within a waterproof cylindrical housing 20, is scanned along the length of piling 12 by means including a pair of counterrotating threaded rods 22 and 23. The transducer assembly 10 is oscillated about the periphery of piling 12 by means including a motor-driven oscillating arm 24 clamped to the piling 12 by clamp 26. A synchro transmitter 28 generates a signal proportional to the vertical movement of the transducer assembly 10 and a potentiometer 30 generates a signal proportional to the horizontal movement of the transducer assembly 10. A display device, illustrated as a cathode-ray tube oscilloscope 34, sweeps an electron beam across the face 36 thereof with a horizontal motion proportional to the signal output of the potentiometer 30. The film contained within a camera 38 is moved vertically past the face 36 with a speed proportional to the output of synchro transmitter 28 which drives synchro receiver 40. The echo pulses received at receiving crystal R are transmitted to the surface via cable 44. At the surface they are used to intensity modulate the electron beam being swept across the face of oscilloscope 34. Therefore, there is produced on the photographic film within camera 38 a picture of the piling 12 similar to that one illustrated in FIGURE 2.

In more detail now, there will be described the operation of the mechanical scanning assembly. The scanning assembly comprises a clamp 26 which includes an upper flange 26a and a lower flange 26b with a concentric recess between the two flanges. To allow attaching the clamp 26 to piling 12, the clamp is broken into two halves and hinged at 46a and 46b. The clamp 26 is fastened securely by bolts or other means at 48a and 48b. To allow for changes in the diameter of pilings to be inspected, a series of set screws 50a and 50b are screwed inward from the mounting flanges 26a and 26b to grip the surface of cylindrical piling 12.

Mounted on bearing surfaces in a concentric recess between the flanges 26a and 26b is a slidable collar 54 which is clamped at 56 by bolts or other means and is hinged on the opposite unshown side. Mounted to the sliding collar 54 is a scanning arm 24 which supports a D-C motor 60. D-C motor 60 drives a gear 62 which meshes with teeth on the upper side of clamp flange 26a. As motor 60 rotates gear 62, the scanning arm 24 is rotated peripherally around the piling 12. In order to provide an indication of the position of the scanning arm 24 and ultimately transducer assembly 10, a potentiometer 30 is mounted on the shaft of motor 60 so that the output of its rotating contact arm is proportional to the horizontal position.

To provide oscillation of the scanning arm 24, the D-C motor 60 is reversed in direction when it reaches a predetermined angle. If the piling 12 contains no trusses or supporting arms extending from the side, the scanning arm 24 may oscillate through 360°. As the scanning arm 24 begins rotating counterclockwise, it trips a limit switch 70 which closes a circuit in reversing switch 72 to reverse the polarity of D-C supply 74 being applied to motor 60. Now as the scanning arm 24 rotates clockwise, it trips another limit switch 76 which again initiates the reversal of the polarity of D-C supply 74. Limit switches 70 and 76 may be positioned at any desired point along clamp 26 in the case of obstructing trusses or supporting members which prevent the scanning arm 24 from oscillating through a 360° scan. Reversing switch 72 may suitably be a latching relay or other devices well known to those skilled in the art.

Extending downward from the scanning arm 24 are a pair of oppositely threaded rods 22 and 23 which are as long as the depth of the piling desired to be inspected. At the bottom of rods 22 and 23 is a supporting arm 80 including a semicircular supporting member 82. Supporting member 82 includes a series of freely rollable wheels 84 engaging the surface of piling 12. The scanning mechanism is so designed that there is an inward pressure applied to the supporting member 82 so that it is held constantly against the surface of the piling 12 as the member 82 oscillates about the piling. Vertical motion is transmitted to the housing 20 by way of traveling block 90 attached to the back of housing 20. Rods 22 and 23, each of opposite screw threads, counterrotate so that the traveling block 90 mounted on the rods with oppositely threaded apertures crawls along rods 22 and 23. Threaded rods 22 and 23, traveling block 90, and housing 20 are preferably constructed of stainless steel or some other noncorrosive material.

The rods 22 and 23 are driven by a D-C motor 100 by way of a spur gear 102 meshing with spur gear 104 securely attached to the top of rod 22. Rod 23 is rotated in a direction opposite to that of rod 22 by means of the spur gear 106 meshing with spur gear 104. As motor 100 drives rods 22 and 23, it also drives synchro transmitter 28. The output of synchro transmitter 28 is connected by way of cable 110 to synchro receiver 40. The angular position of the output shaft of synchro receiver 40 is the same as the angular position of motor 100 and thus proportional to the vertical position of transducer assembly 10.

There will now be described in more detail the electrical apparatus for generating energy pulses and displaying them in the form of a picture of the piling 12. Located within housing 20 is a free-running electronic pulser 120 which may be a thyratronic-type switch. Pulser 120 generates high voltage electrical pulses to excite transmitting crystal T so that a sonic pulse is emitted. Simultaneously with the excitation of crystal T, a sync pulse is generated and transmitted to the surface platform via cable 44. The sync pulse may be better seen by referring to the waveform diagram of FIGURE 4 as waveform A. When a pulse is reflected from the surface of piling 12, receiving crystal R upon receiving the pulse converts it into a representative electrical pulse which may look similar to waveform D. Electrical pulse D is amplified in amplifier 122 and sent via cable 44 to the surface equipment where it is amplified again in amplifier 128 and shaped in detector 130. Detector 130 includes a semiconductor diode 132 and a parallel connected resistor 133 and capacitor 134 connected from the cathode thereof to ground. Detector 130 rectifies the receiver pulse D and smoothes it to produce a pulse with waveform E. Waveform E is then applied to the Z-axis or sensitivity input of oscilloscope 34. The intensity control of oscilloscope 34 should be turned down so that the electron beam swept across the face 36 is intensity modulated only in the presence of an echo pulse, as by waveform E.

The signal output of the potentiometer 30 is applied via a conductor 135 to the horizontal input of oscilloscope 34. Horizontal deflection means are illustrated as electrostatic deflection plates 135a but it will be understood of course that magnetic deflection means may be used. There appears then on the face 36 of oscilloscope 34 an oscillating horizontal line which is intensity modulated whenever an echo pulse is received at receiver R.

Optically coupled to the face 36 of oscilloscope 34 is the lens of a camera 38. The photographic film within camera 38 is driven vertically past the face 36 with a speed proportional to the vertical movement of the transducer assembly 10. The synchro receiver 40 rotates the internal sprocket drive of camera 38 at a rate determined by the output of synchro transmitter 28. Thus there is produced on the photographic film, after development, a picture of the piling 12 looking similar to that of FIGURE 2.

To prevent the electron beam from being modulated by spurious signals, oscilloscope 34 is presensitized so that the electron beam can be intensity modulated only during the expected arrival time of an echo pulse. More particularly, each of the sync pulses A triggers a delay monostable multivibrator 136 into its quasi-stable state for the generation of a positive-going rectangular waveform B. The horizontal sweep time-base circuit 138 within oscilloscope 34 responds to the negative-going trailing edge of waveform B to remove positive potential from the cathode 142 of oscilloscope 34. Thus, during the duration of waveform C the electron beam of the oscilloscope 34 may be intensity modulated by echo pulses E.

As an example of a specific scanning pattern using the system of FIGURE 3, consider a cylindrical piling 100 feet long having a diameter of about 24 inches. For a detailed examination of the piling, a scan can be made about every inch. For a 360° scan, an oscillation of about 10 seconds duration is suitable. Therefore, to scan the entire length of the 100-foot piling, roughly 200 minutes are required. For a simple reconnaissance inspection of a piling of about the same dimensions, a scan may be made every half foot. Therefore, the inspection time is roughly one-half hour.

Suitable for use in the display device of our invention is a modified oscilloscope such as Model 535A available from the Tektronix Company, Portland, Oreg. The oscilloscope should be modified so that the horizontal sweep circuit 138 continues to operate even though an external sweep is applied to the horizontal plates 135a. The horizontal display switch must be rewired so that the horizontal sweep circuit 138 still retards the electron beam except for a sweep time after being triggered by an external trigger pulse.

The delay monostable multivibrator 136 may be any one of several well known in the art, but may suitably be the one described in "Transistor Circuit Design," Texas Instruments Incorporated, 1964, pages 380–381. The camera 38 may suitably be a Mark II Oscillotron with a Model 13302 70 mm. magazine available from Beattie-Coleman, Inc., in Anaheim, Calif.

Figure 5:
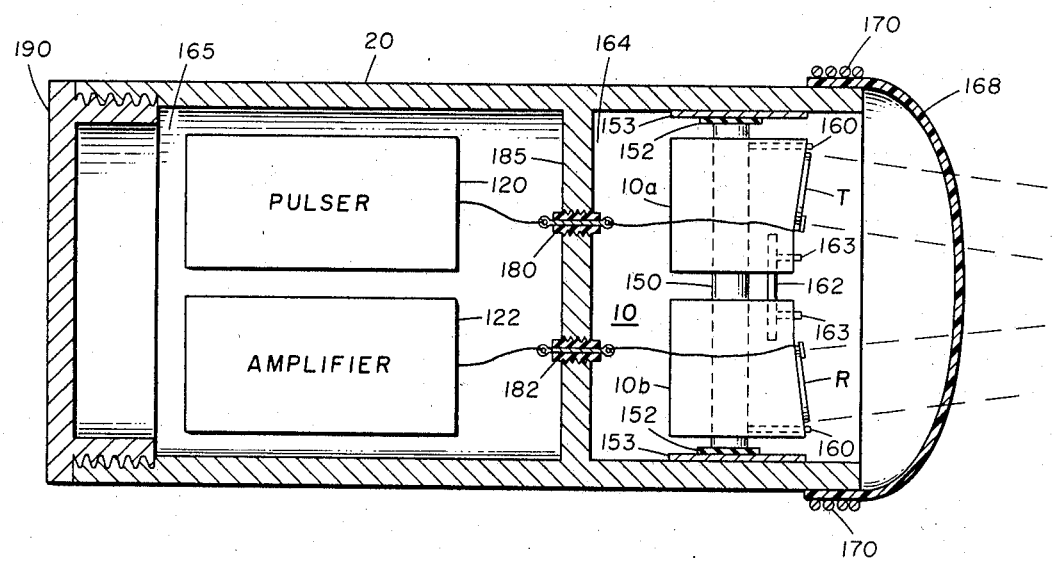
FIGURE 5 illustrates a cross-sectional view of a transducer assembly suitable for use in our invention.

There will now be described the details of the transducer assembly 10 with reference to FIGURE 5. The transducer assembly 10 is comprised of an upper block 10a and a lower block 10b. A transmitting crystal T, which may be composed of lead zirconate titanate (PZT) in the shape of a disc of 1" diameter x 0.05" thickness, is cemented to the outward face of block 10a. Similarly, a receiver crystal R of similar composition and dimensions is cemented to the outward face of block 10b. Terminals may be attached to the faces of crystals T and R by soldering with a silver-lead alloy and then the entire face of each crystal may suitably be covered with an epoxy coating. Blocks 10a and 10b may be suitably composed of a material of low acoustic impedance, such as lead or aluminum to match the acoustic impedance of crystals T and R. Passing slidably through blocks 10a and 10b is a central rod 150. Rod 150 is mounted at either end on a soft pad 152 of vibration-absorbent material, such as rubber, and then on mounting flanges 153. So that the focusing distance of crystals T and R may be varied, blocks 10a and 10b may be separated different distances from each other by sliding each block up and down along rod 150 and securing the blocks to the rod 150 by means of set screws 160. A pin 162, held by set screws 163, may provide further support for the two blocks 10a and 10b.

Housing 20 may suitably be a cylindrical pipe including a transducer cavity 164 and an electronics cavity 165. The transducer cavity 164 may be filled with a light oil, and the exposed end of cavity 164 may be covered with a cup-shaped boot 168 composed of neoprene. The boot 168 may be secured to the cylindrical housing 20 by means of bands of wire 170, soldered together.

Signal leads are attached between pulser 120 and transmitting crystal T and amplifier 122 and receiving crystal R by means of feedthrough terminals 180 and 182 screwed into the separating partition 185. The electronics cavity 165 may be waterproofed by a screw-on end cap 190 which may be permanently welded to the traveling block 90 of FIGURE 3.

It will be readily apparent that there may be certain modifications to our invention. For instance, there may be display devices used other than a cathode-ray oscilloscope. An electrically sensitive paper recorder, using paper such as Teledeltos paper available from Gubelman Charts Division of Nashua Corporation, Newark, N.J., may be used. In this type of recorder, a recording beam of energy, such as the electrons in a wire, may be swept across a paper recording surface. In the presence of an echo pulse, a beam of electric current burns or otherwise sensitizes the paper recording medium.

Further, modifications may be made in the use of a cathode-ray oscilloscope for use in our invention. Instead of using a camera for recording, a self-developing camera, such as those available from the Polaroid Corporation, may be used. In this modification, the synchro transmitter 28 or other signal generating means is used to produce a monotonic voltage proportional to the depth of the transducer assembly. This monotonic voltage is connected to the vertical plates of oscilloscope 34. Therefore, the electron beam is scanned across the face 36 with a motion directly related to the scaning pattern of transducer assembly 10. After a certain interval of scanning, a photograph may be taken of the face of the oscilloscope.

Furthermore, while separate transmitting and receiving crystals have been illustrated, it will be readily apparent that a single crystal may be used with suitable switching circuitry, such as a T-R switch well known in the radar art.

Now that our invention has been fully described, it will become apparent to those skilled in the art that certain other modifications may be made without departing from the principles of our invention. It is intended to cover all such changes as fall within the scope of the appended claim.

What is claimed is:
1. Apparatus for inspecting the exterior surface of a submerged pile and the like, comprising:
  (a) a transducer assembly for generating and receiving a beam of ultrasonic pulses;
  (b) a scanning arm secured at the upper end of said pile and adapted for movement about the periphery of said pile;
  (c) a supporting member adapted to engage the surface of the lower end of said pile;
  (d) a pair of counterthreaded rods mounted rotatably at one end of said scanning arm and at the other end in said supporting member, said rods passing threadedly through said transducer assembly;
  (e) means for rotating said rods in opposite directions and moving said scanning arm about said pile, whereby said transducer assembly moves along said rods and about the periphery of said pile in a scanning pattern and ultrasonic pulses reflected from the surface of said pile are received by said transducer assembly;
  (f) means for generating signals proportional to the position of said transducer assembly in said scanning pattern; and
  (g) a display device including means for sweeping a recording beam of energy across a recording medium in accordance with said position signals and means for intensity modulating said recording beam of energy with signals representative of said reflected ultrasonic pulses, whereby there is produced on said recording medium an indication of the physical condition of said pile.

References Cited

UNITED STATES PATENTS

| | | | |
|---|---|---|---|
| 2,883,860 | 4/1959 | Henry | 73—67.9 |
| 3,021,706 | 2/1962 | Cook et al. | 73—67.8 |
| 3,023,611 | 3/1962 | Howry | 73—67.8 |
| 3,086,390 | 4/1963 | Brown | 73—67.8 |
| 3,269,173 | 8/1966 | Von Ardenne | 73—67.9 |
| 2,631,270 | 3/1953 | Goble | 181—.5 XR |
| 2,825,044 | 2/1958 | Peterson | 181—.5 XR |
| 3,369,626 | 2/1968 | Zemanek | 73—67.7 |

RICHARD C. QUEISSER, *Primary Examiner.*

JOHN P. BEUCHAMP, *Assistant Examiner.*

U.S. Cl. X.R.

73—67.9